Sept. 15, 1925
J. T. WILSON
ELEMENT FASTENING CONSTRUCTION
Filed July 26, 1921
1,553,348
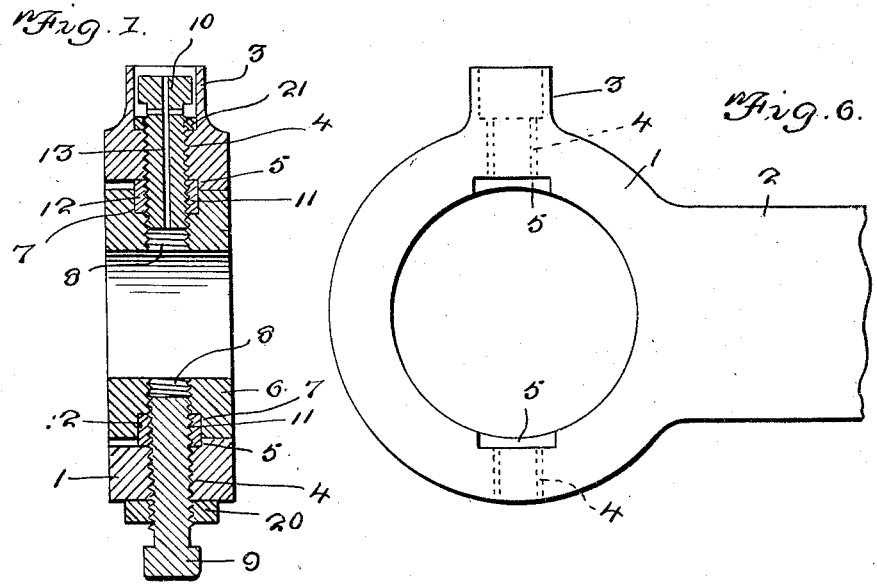
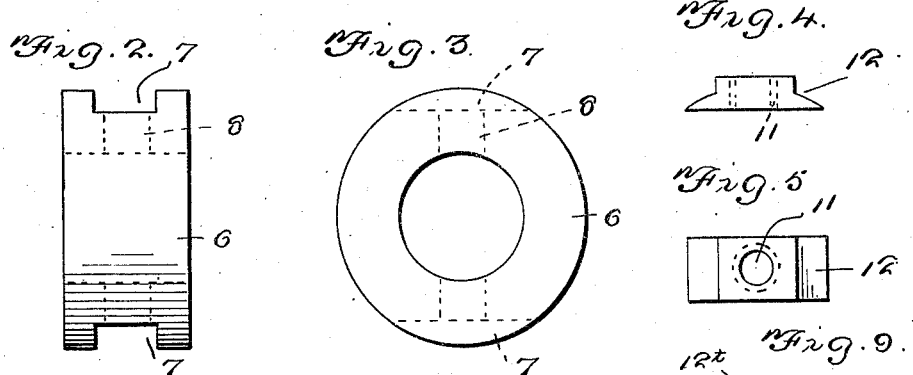
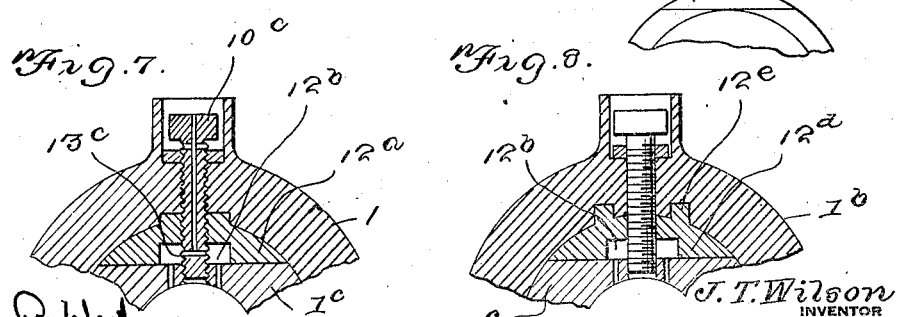

Patented Sept. 15, 1925.

1,553,348

UNITED STATES PATENT OFFICE.

JOHN T. WILSON, OF MUSKOGEE, OKLAHOMA.

ELEMENT-FASTENING CONSTRUCTION.

Application filed July 26, 1921. Serial No. 487,771.

*To all whom it may concern:*

Be it known that I, JOHN T. WILSON, a citizen of the United States, residing at Muskogee, in the county of Muskogee and State of Oklahoma, have invented new and useful Improvements in Element-Fastening Construction, of which the following is a specification.

The object of my present invention is the provision of a simple, easily assembled, efficient and durable element fastening construction, designed more especially for holding a bushing against lateral movement where a collar cannot be used.

To the attainment of the foregoing, the invention consists in the improvement as hereinafter described and definitely claimed.

In the accompanying drawings, forming part of this specification:—

Figure 1 is a diametrical section taken through the construction constituting the best practical embodiment of my invention of which I am cognizant.

Figure 2 is an edge elevation of the bushing.

Figure 3 is a side elevation of the bushing.

Figure 4 is a side elevation of one of the keys comprised in the improvement.

Figure 5 is a plan view of the same.

Figure 6 is a side elevation of the improvement.

Figures 7 and 8 are detail sections showing slight modifications.

Figure 9 is a detail view of another slight modification.

Similar numerals designate corresponding parts in Figures 1 to 6 to which reference will first be made.

The housing 1 at one end of a rod 2 is provided at 3 with an oil cup, and is also provided at 4 with diametrically opposite bores, and at 5 with diametrically opposite seats, the bores 4 being arranged in alinement, and the seats 5 being arranged about the inner ends of the said bores.

A bushing 6 is designed for arrangement within the housing 1, Figure 1, and is characterized by diametrically opposite seats 7, and by threaded bores 8 that are alined with each other and the bores 4 and are designed to receive screws 9 and 10. The said screws 9 and 10 are also threaded through apertures 11 in the keys 12 which occupy the seats 5 and 7 in the housing 1 and bushing 6, respectively. The screw 10 is provided as indicated by 13 with a duct designed and adapted to conduct lubricant from the cup 3 to the interior of the bushing 6.

It will be apparent from the foregoing that my novel construction is susceptible of being expeditiously and easily assembled, and when it is assembled as shown in Figure 1, the keys or anchors 12 are adapted to effectively hold the bushing 6 against turning and against lateral shifting; the flat sides of the keys or anchors 12 bearing against the corresponding flat sides or bottoms of the seats 7 in the bushing. In performing the said functions the keys or anchors 12 are manifestly assisted by the screws 9 and 10.

In order to preclude casual loosening of the screws 9 and 10 I prefer to provide the screw 9 with a lock nut 20 and the screw 10 with a lock nut 21; the said lock nut 21 being disposed at the bottom of the oil cup 3 as illustrated.

In Figure 7 I illustrate a slight modification for use when the bushing or bearing is to be held against a moving element requiring lubrication. In the bottom of the key $12^a$ is a chamber $12^b$ to contain oil or grease. When oil is used the chamber $12^b$ can be filled with absorbent material such as waste or moss, and when grease is employed an extra supply of grease can be packed in the chamber, this grease being used only in case of unusual heat from bearing which will soften the grease and cause it to feed through the apertured bushing $1^c$ to the bearing so as to preclude overheating of the bearing. The screw $10^c$ in the modification, Figure 7, is provided with an auxiliary duct $13^c$ for the supply of oil to the chamber $12^b$, though it will also be understood that the said screw can be removed for the filling of the chamber $12^b$ with oil or grease.

In the modification shown in Figure 8, the key $12^d$ is provided with projections $12^e$ seated in the housing $1^b$. It is to be understood, however, that the said projections $12^e$ may be employed or altogether omitted without affecting my invention.

Where the inside element or key $12^t$ is anchored against the moving outside element, as in a cylinder packing ring, Figure 9, the flat side of the key performs the same service as an outside projection on the key.

I have entered into a detailed description of the construction and relative arrangement of parts embraced in the present and preferred embodiment of my invention, in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters-Patent, is:—

1. In an element fastening construction, the combination of a housing having diametrically opposite threaded bores and comparatively large seats at the inner ends of said bores, a bushing disposed in the housing and having diametrically opposite threaded bores and comparatively large seats at the outer ends of said bores, keys or anchors snugly arranged in the said seats and within and between the housing and the bushing and having threaded apertures aligned with said bores, and bolts extending through and connecting the housing, keys and bushing and equipped with lock nuts.

2. In an element fastening construction, the combination of a housing having a threaded bore and an enlarged seat at the inner end of said bore, a bushing disposed within the housing and having a corresponding seat and also having a threaded bore extending inwardly from said seat and aligned with the first named bore, an anchor or fastener disposed in the said seats and having a threaded aperture coincident with said threaded bores, and a screw extending through the threaded aperture in the fastener and engaging the threads in the portion of the housing and bushing.

In testimony whereof I affix my signature.

JOHN T. WILSON.